Figure 4:
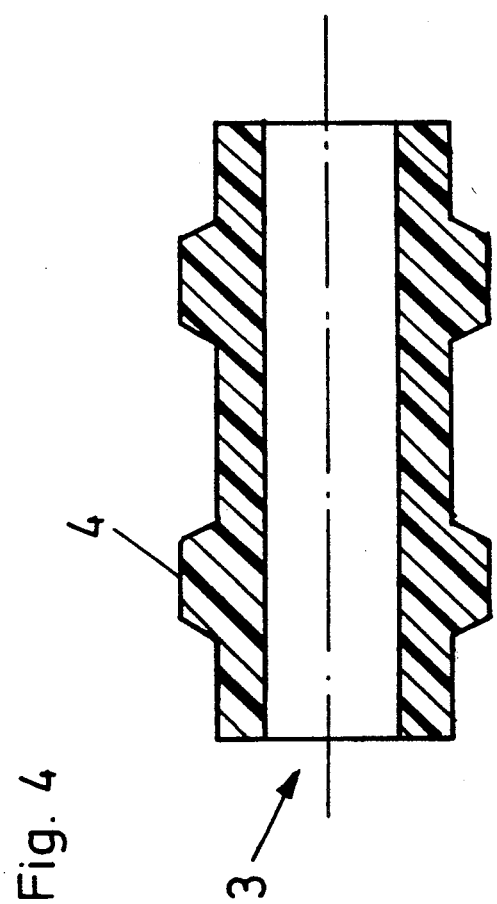

United States Patent [19]

Pfister et al.

[11] Patent Number: 5,086,751
[45] Date of Patent: Feb. 11, 1992

[54] SAW CABLE WITH SPACERS BETWEEN ADJACENT CUTTING BEADS

[75] Inventors: Johann Pfister, Hart; Karl Daum, Kolsass, both of Austria

[73] Assignee: Tyrolit Schleifmittelwerke Swarovski K.G., Schwaz, Austria

[21] Appl. No.: 678,154

[22] Filed: Apr. 2, 1991

[30] Foreign Application Priority Data

Apr. 3, 1990 [AT] Austria .................. 768/90

[51] Int. Cl.$^5$ .............................. B28D 1/08
[52] U.S. Cl. ........................ 125/21; 125/22
[58] Field of Search ................... 125/21, 22

[56] References Cited

U.S. PATENT DOCUMENTS 3,661,137  5/1972  Prowse et al. ............ 125/21

FOREIGN PATENT DOCUMENTS 0160625 11/1985 European Pat. Off. .
0306952  3/1989 European Pat. Off. .
3148065  7/1982 Fed. Rep. of Germany .
1378362 10/1964 France ............ 125/21

Primary Examiner—M. Rachuba
Attorney, Agent, or Firm—Wenderoth, Lind & Ponack

[57] ABSTRACT

A saw cable for a cable saw for cutting natural rock or stone, masonry or the like includes cutting beads provided with cutting grain, for example diamond, provided at intervals or spacings from each other on a metal cable. Spacer sleeves of castable or injection-moldable material are disposed between the cutting beads. The diameter of the spacer sleeves is smaller than the diameter of the cutting beads. The spacer sleeves (4) have annular lands (4'), the diameter of which is the same as the diameter of the cutting beads.

13 Claims, 3 Drawing Sheets

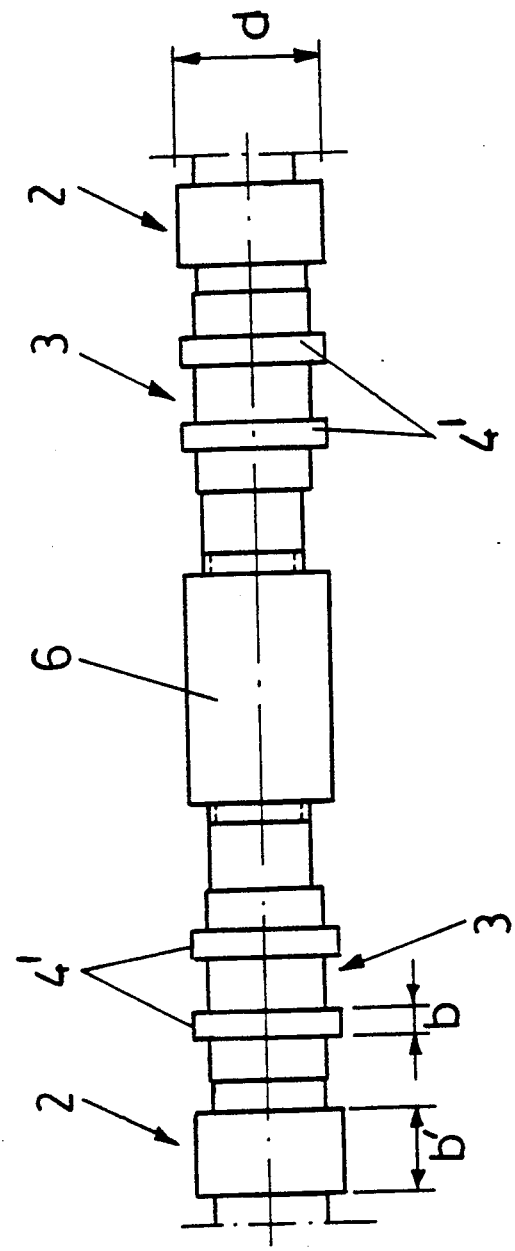

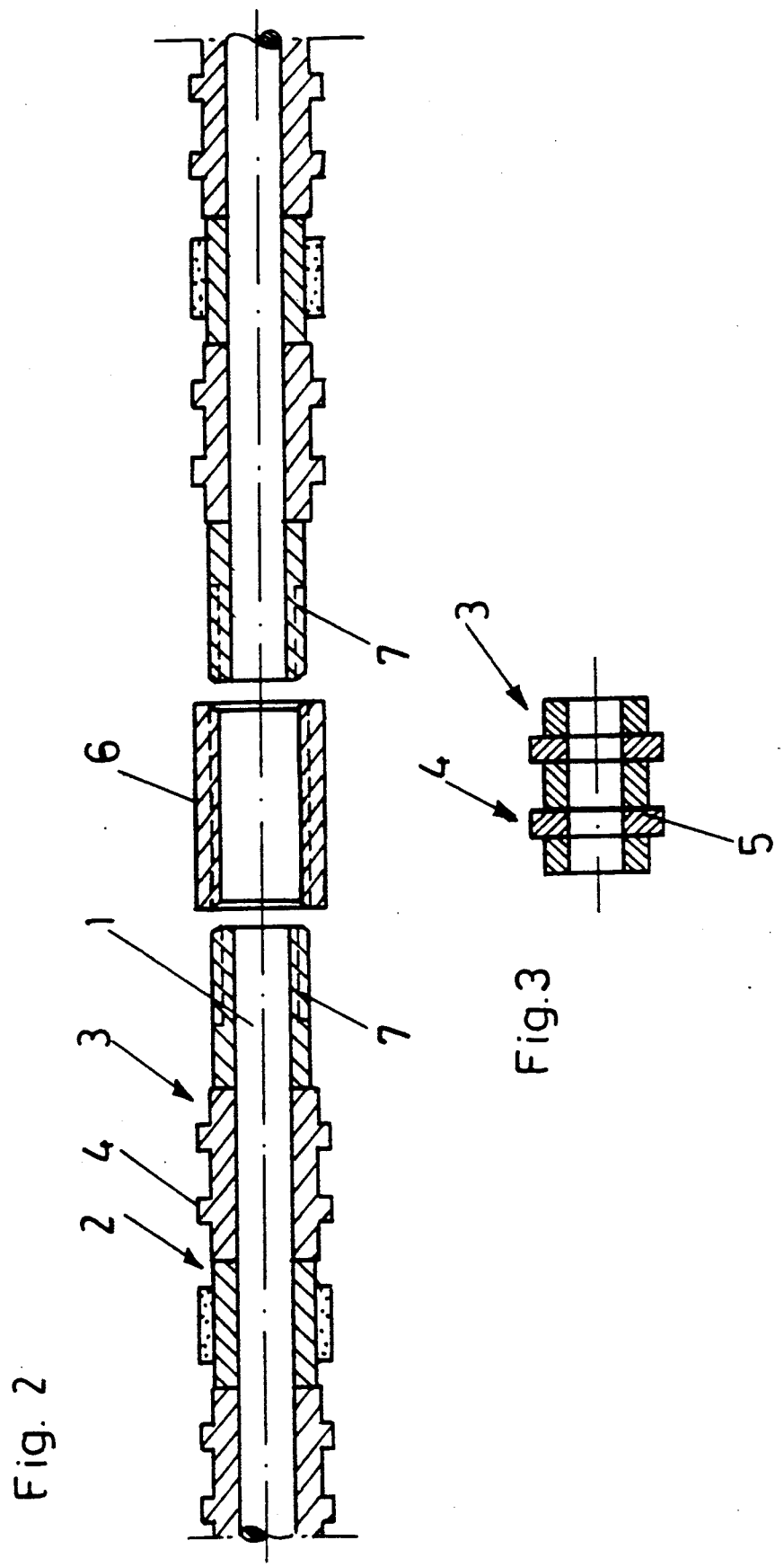

SAW CABLE WITH SPACERS BETWEEN ADJACENT CUTTING BEADS

BACKGROUND OF THE INVENTION

The invention relates to a saw cable for a cable saw, in particular for cutting natural stone or rock, masonry or the like, comprising a preferably metal cable on which cutting beads provided with cutting grain, for example diamond, are arranged at intervals or spacings from each other. Disposed between the cutting beads are spacer sleeves of castable or injection-moldable material, the diameter of which is smaller than the outer diameter of the cutting beads. The spacer sleeves are provided with annular lands of a diameter at least approximately the same as the diameter of the cutting sleeve.

Previously, natural stone or rock in a quarry or in a works was cut by means of an endless steel cable, with an abrasive slurry being introduced into the kerf as a removal agent. The cutting operation was very slow by such procedure.

In addition, it is known to cut stone or rock blocks by saw cables on to which so-called cutting beads are threaded. The cutting beads generally comprise a metal carrier body, provided with diamond chips.

In accordance with the earlier state of the art, the cutting beads were held at intervals or spacings from each other by coil springs.

German laid-open application (DE-OS) No. 31 48 065 discloses a diamond-equipped cable for the cutting processing of stone or rock materials in which cutting beads are disposed on a metal cable and provided between the cutting beads which carry diamonds are spacer sleeves which are produced by sintering a material which does not contain any diamonds.

European patent application No. 160 625 discloses a saw cable in which cutting beads which are disposed on a metal cable are cast into a layer of a thermoplastic rubber material which covers the cable. In that way the cutting beads are held at suitable spacings from each other and in addition also perform a rotary movement with the cable.

European patent application No. 306 952 discloses a saw cable wherein a cable covering of a yielding material, for example rubber or a synthetic resin, is provided between the cutting beads. In one embodiment the cable cover is provided with annular lands at its ends which are adjacent to the cutting beads. The diameter of the annular lands however is less than the diameter of the cutting beads.

SUMMARY OF THE INVENTION

The object of the present invention is to saw cable of the kind set forth alone and operable provide on improved in such a way as to provide for good guidance of the cable saw in the cutting passage.

This object according to the invention is achieved in that the diameter of the lands is at least approximately the same as the diameter of the cutting beads.

The lands may be produced in one piece with the spacer sleeves from a homogeneous material or they may be formed by metal discs which are fitted into the spacer sleeves.

The lands advantageously are relatively narrow so that the width thereof is less than the width of the cutting beads.

An embodiment of the invention provides that the width of the lands is less than the width of the cutting beads and the lands are disposed at a spacing from the cutting beads.

BRIEF DISCRIPTION OF THE DRAWINGS

Embodiments of the invention are described hereinafter with reference to the accompanying drawings, wherein FIG. 1 shows a plan view of a saw cable according to the invention, FIG. 2 is a view in section through a saw cable according to the invention, FIG. 3 is a view in section through a spacer sleeve, and FIG. 4 is a similar view of a modified spacer sleeve.

A main body of a saw cable according to the invention is a steel cable 1 which is made from a plurality of steel wires. Cutting beads 2 which are equipped with diamond chips are arranged at regular intervals or spacings on the steel cable 1. A spacer sleeve 3 of a plastic material is disposed between each two adjacent cutting beads 2 in contact or abutment therewith.

The spacer sleeves 3 and the cutting beads 2 are in a fixed association with the steel cable 1 so that the cutting beads 2 and the spacer sleeves 3 also perform rotary movements with the steel cable.

The spacer sleeves 3 are provided with radial projections formed by lands 4. As shown in FIG. 1, the lands 4 are annular.

As can be seen from the FIG. 1, the lands 4 are relatively narrow so that their axial width b is approximately half the axial width b' of the abrasive portion of each of the cutting beads 2. A plurality of annular lands 4 are advantageously provided on a spacer sleeve 3.

As can be seen from FIG. 3, the lands 4 are of rectangular cross-section so that the spacer sleeve 3 is of an angular external profile, which provides particularly good transportation properties. Good results were also achieved with lands 4 of trapezoidal cross-section, as shown in FIG. 4, when dealing with different kinds of stone and rock.

FIG. 3 shows an embodiment wherein the lands 4 in the spacer sleeve 3 are formed by metal discs 5 which are fitted into the spacer sleeve 3.

In all embodiments the spacer sleeve has a main body having a diameter less than the outside diameter d of cutting beads 4, but the outside diameter of the lands 4 is approximately equal to the outside diameter d of the cutting beads 2.

As the saw cable is used as an endless cable, there is also a connecting or closure sleeve 6 by means of which the cable ends 7 are connected together. A plurality of cable portions may also be connected to form a saw cable.

What is claimed is:

1. A saw cable for a cable saw, for cutting natural stone or rock, masonry or the like, said saw cable comprising:
    a cable;
    a plurality of cutting beads provided on and spaced along said cable with intervals between adjacent pairs of said cutting beads, said cutting beads having an abrasive cutting grain;
    a plurality of non-abrasive spacer sleeves provided on said cable, with each said spacer sleeve being positioned in a respective said interval between a respective adjacent pair of said cutting beads and in abutment therewith; and each said spacer sleeve including a main body having a diameter less than an outer diameter of said cutting beads and at least one annular land extending outwardly from said main body and having an outer diameter at least approximately the same as said diameter of said cutting beads.

2. A saw cable as claimed in claim 1, wherein said cable is metal.

3. A saw cable as claimed in claim 1, wherein said abrasive cutting grain is diamond.

4. A saw cable as claimed in claim 1, wherein each said spacer sleeve has extending outwardly therefrom plural said annular lands.

5. A saw cable as claimed in claim 4, wherein each said spacer sleeve has extending outwardly therefrom two axially spaced annular lands.

6. A saw cable as claimed in claim 1, wherein said annular land comprises a disc fitted into said main body.

7. A saw cable as claimed in claim 6, wherein said disc is metal.

8. A saw cable as claimed in claim 1, wherein said annular land has a rectangular configuration as viewed in longitudinal section through said saw cable.

9. A saw cable as claimed in claim 1, wherein said annular land has a trapezoidal configuration as viewed in longitudinal section through said saw cable.

10. A saw cable as claimed in claim 1, wherein said annular land has an axial width less than an axial width of an abrasive portion of said cutting bead.

11. A saw cable as claimed in claim 10, wherein said annular land is spaced axially from said adjacent pair of said cutting beads.

12. A saw cable as claimed in claim 1, wherein said spacer sleeves are formed of a castable material.

13. A saw cable as claimed in claim 1, wherein said spacer sleeves are formed of injection-moldable material.

* * * * *